(12) United States Patent
Kirovski et al.

(10) Patent No.: US 8,214,890 B2
(45) Date of Patent: Jul. 3, 2012

(54) LOGIN AUTHENTICATION USING A TRUSTED DEVICE

(75) Inventors: Darko Kirovski, Kirkland, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 12/198,914

(22) Filed: Aug. 27, 2008

(65) Prior Publication Data

US 2010/0058064 A1   Mar. 4, 2010

(51) Int. Cl.
*G06F 15/16* (2006.01)
(52) U.S. Cl. ......................................... 726/12
(58) Field of Classification Search .................. 713/171; 726/12, 9
See application file for complete search history.

(56) References Cited

U.S. PATENT DOCUMENTS

| | | | |
|---|---|---|---|
| 5,822,435 A * | 10/1998 | Boebert et al. | 713/192 |
| 7,149,805 B2 | 12/2006 | Bartolome et al. | |
| 7,194,690 B2 | 3/2007 | Guillermo et al. | |
| 2004/0097217 A1 | 5/2004 | McClain | |
| 2004/0253923 A1 | 12/2004 | Braley et al. | |
| 2006/0135064 A1 | 6/2006 | Cho et al. | |
| 2006/0136334 A1 | 6/2006 | Atkinson et al. | |
| 2006/0206709 A1 | 9/2006 | Labrou et al. | |
| 2007/0123166 A1 | 5/2007 | Sheynman et al. | |
| 2007/0226484 A1 | 9/2007 | Pering et al. | |
| 2010/0012715 A1 | 1/2010 | Williams et al. | |

FOREIGN PATENT DOCUMENTS

| | | |
|---|---|---|
| EP | 1253500 A1 | 10/2002 |
| EP | 1578093 A1 | 9/2005 |
| WO | 2007071009 A1 | 6/2007 |

OTHER PUBLICATIONS

Saxena, "Secure Device Pairing based on a Visual Channel," retrieved at <<http://eprint.iacr.org/2006/050.pdf>>, Proceedings of the 2006 IEEE Symposium on Security and Privacy, 2006, 17 pages.
McCune, et al., "Seeing-is-believing: Using Camera Phones for Human-verifiable Authentication," retrieved at <<http://report-archive.adm.cs.cmu.edu/anon2004/CMU-CS-04-147.pdf>>, Technical Report No. CMU-CS-04-174, Carnegie Mellon University, Nov. 2004, 22 pages.
Im, Seunghyun, "Validating Secure Connections between Wireless Devices in Pervasive Computing Using Data Matrix," retrieved at <<http://ieeexplore.ieee.org/stamp/stamp.jsp?arnumber=04505718>>, International Conference on Multimedia and Ubiquitous Engineering, 2008, pp. 186-190.

(Continued)

*Primary Examiner* — Philip Chea
(74) *Attorney, Agent, or Firm* — Lyon & Harr, LLP; Richard T. Lyon

(57) ABSTRACT

A user working on a client computer is allowed to remotely login to a server over a computer network. A first secure connection is established between the client and the server. Communications with a trusted device which is in the user's control is established via a communication channel between the trusted device and the client, where this channel is not part of the network. A second secure connection is established between the trusted device and the server through the client, where this second secure connection is tunneled within the first secure connection. The user remotely logs into the server over the second secure connection using the trusted device.

20 Claims, 13 Drawing Sheets

OTHER PUBLICATIONS

Kim, et al., "Providing Secure Mobile Device Pairing Based on Visual Confirmation," retrieved at <<http://ieeexplore ieee.org/stamp/stamp.jsp?arnumber=05157021>>, 13th IEEE International Symposium on Consumer Electronics, May 2009, pp. 676-680.

Tsudik, Gene, "Secure Device Pairing," retrieved at <<http://www.eurecom.fr/teaching/engineering/page40379/file40063.pdf>>, University of California, Irvine, retrieved on Feb. 9, 2010, 50 pages.

Wuset, Candid, "Phishing in the Middle of the Stream, Today's Threats to Online Banking," retrieved at <<http://nortonghost.com/avcenter/reference/phishing.in.the.middle.of.the.stream.pdf>>, Whitepaper, Symantec Security Response, Symantec Corporation, Sunnyvale, CA, 28 pages.

Mannan, et al., "Using a Personal Device to Strengthen Password Authentication from an Untrusted Computer," retrieved at <<http://www.ccsl.carleton.ca/paper-archive/2007/TR-07-11.pdf>>, revised Mar. 2007, Financial Cryptography and Data Security, Lecture Notes in Computer Science, vol. 4886/2008, 21 pages.

Wu, et al., "Secure Web Authentication with Mobile Phones," retrieved at <<http://www.simson.net/clips/academic/2003.sow.pdf>>, DIMACS Workshop on Usable Privacy and Security Software, 2004, 2 pages.

"Secure Logins and Protect Customer Accounts against Online Fraud with Risk-Based Authentication," retrieved at <<http://www.digital-resolve.net/solutions/login_authentication.html>>, retrieved on Jun. 6, 2008, Digital Resolve, Norcross, GA, 2 pages.

Kirovski, et al., "Tunneled TLS for Multi-Factor Authentication," retrieved at <<http://research.microsoft.com/pubs/80471/report.pdf>>, Technical Report MSR-TR-2009-50, Apr. 2009, Microsoft Corporation, Redmond, WA, 12 pages.

McCune, et al., "Seeing-Is-Believing: Using Camera Phones for Human-Verifiable Authentication," Int. J. Security and Networks, vol. 4, Nos. 1/2, 2009, pp. 43-56.

* cited by examiner

LOGIN AUTHENTICATION USING A TRUSTED DEVICE

BACKGROUND

Communication network-based information services have become the norm in today's world. In fact, most every computing device which provides information services is capable of connecting to one or more different types of communication networks, and is generally capable of sharing information with a global array of other computing devices via the networks. The Internet and the related World Wide Web are prime examples of a ubiquitous global communication network and a global information service framework. Many people in the world today routinely use a network-attached client computing device to remotely access "online" information services which are provided by various network-attached server computing devices. Examples of such online information services which are routinely remotely accessed by users via client devices include reading and sending emails, purchasing goods and services, information sharing and retrieval, entertainment, and banking, just to name a few.

Many types of online information services today require prospective users to first formally login to a previously established user account on a secure server which provides the desired service(s). The user login procedure generally requires that the prospective users be positively identified and authenticated before they are allowed to access the information services provided by the secure server. The user login procedure is commonly performed via each prospective user supplying the secure server with a username and a password which uniquely identify the user to the server. In the case where the prospective users are remotely logging into the secure server from a client, a secure connection may be established between the client and the server in order to enhance the security of communications during the user login procedure.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Login authentication (LA) technique embodiments described herein generally allow a user working on a client computer to remotely login to a server over a computer network. In an exemplary embodiment a technique is provided which first establishes a first secure connection between the client and the server. Communications with a trusted device which is in the user's control is then established via a communication channel between the trusted device and the client, where this channel is not part of the network. A second secure connection is then established between the trusted device and the server through the client, where this second secure connection is tunneled within the first secure connection. The user then remotely logs into the server over the second secure connection using the trusted device.

As will be appreciated from the Detailed Description which follows, the LA technique embodiments described herein are simple and low cost in that they do not require that a specialized, tamper-resistant token device (or related specialized token software) be purchased for and employed by each client user in order for them to be able to successfully login to the secure server. Furthermore, the LA technique embodiments are not prone to information "leakage" to various forms of malware which may be installed on the clients by a malicious party such as a key-logger application, a phishing agent application, an intrusive virtual machine application (which is under the control of a malicious party and can manipulate the client's data and control flows), a "ghost" user interface application (i.e., a transaction generator which is hidden from the user and is under the control of a malicious party), and the like. In addition to these benefits, other advantages of the LA technique embodiments described herein will become apparent from the Detailed Description which follows hereafter when taken in conjunction with the drawing figures which accompany the Detailed Description.

DESCRIPTION OF THE DRAWINGS

The specific features, aspects, and advantages of the login authentication (LA) technique embodiments described herein will become better understood with regard to the following description, appended claims, and accompanying drawings where:

DETAILED DESCRIPTION

Figure 1:
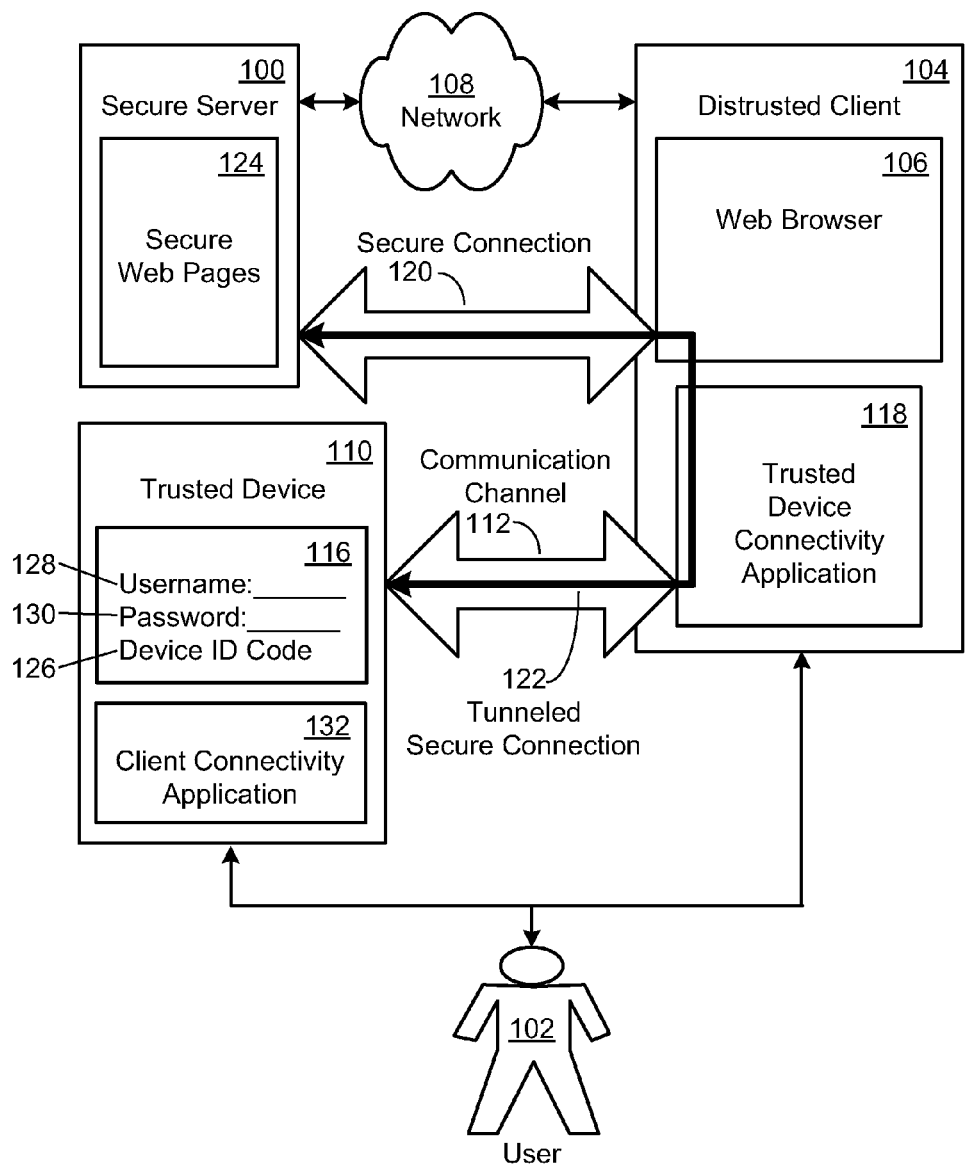
FIG. 1 illustrates a diagram of an exemplary embodiment, in simplified form, of a general architecture of a system for implementing the LA technique embodiments described herein.

In the following description of login authentication (LA) technique embodiments reference is made to the accompanying drawings which form a part hereof, and in which are shown, by way of illustration, specific embodiments in which LA techniques can be practiced. It is understood that other embodiments can be utilized and structural changes can be made without departing from the scope of the LA technique embodiments.

The term "secure server" is used herein to refer to a network-attached server computing device which requires each prospective user to first formally login to a previously established user account thereon in order to authenticate their ability to access one or more information services provided by the server. The term "distrusted client" is used herein to refer to a network-attached client computing device which is not "trusted" by its users. By way of example but not limitation and as is described in more detail hereafter, a distrusted client can be a client whose users cannot be certain has not been "infected" by a Trojan virus or other type of malware, where the virus/malware may have been installed on the client by a malicious party in order to allow the party to access the client user's secret login credentials. A distrusted client can also be a client on which a malicious party may attempt to trick its users into revealing their login credentials via fraudulent methods such as a phishing attack, spoofing attack, and the like. In cases where the client communicates with the network via a wireless network connection, a distrusted client can also be a client from which a malicious party may attempt to passively intercept the client user's login credentials via fraudulent methods such as a sniffing attack and the like. Exemplary distrusted clients can include a publicly shared personal computer (PC) such as a PC residing in an Internet café, a public library, or a hotel business center, a PC which is borrowed from someone else, and the like.

The term "trusted" is used herein to refer to a device whose networking protocol stack is robust to intrusion attacks or a device which resides in a secure networking environment such as a corporate setting. Thus, a trusted device is one which a user can be reasonably certain has not been infected by a Trojan virus or other type of malware. A trusted device is also generally immune to the aforementioned fraudulent methods a malicious party might use to obtain a user's secret login credentials.

It is noted that although the LA technique embodiments are described herein in relation to the Internet, the LA technique embodiments are also operational on private intranets which use the public Internet computing devices and networks to offer a select group of private information services to a restricted group of users, as well as on any other collection of computing devices and networks not associated with the Internet.

1.0 Login Security

A number of different information security vulnerabilities can exist when a user remotely logs into a secure server computing device from a distrusted client computing device. By way of example but not limitation, the user's secret login credentials such as their username, password, account numbers, and the like can be unknowingly "leaked" to (i.e., captured by) a key-logger application or some other form of malware which was installed on the client by a malicious party. Even in situations where the client's web browser is securely built and employs a trustworthy secure connection for login to the server, these types of login information security vulnerabilities are rampant today since they can be introduced onto the client via polymorphic Trojan viruses.

Additionally, even on a client for which the user is certain that a key-logger does not exist, a malicious party can employ various methods to trick the user into revealing their secret login credentials, financial records, and the like. Examples of such methods that are commonly used by malicious parties include, but are not limited to, the following. A phishing attack can attempt to acquire the user's login credentials by fraudulently masquerading as a trustworthy electronic entity such as a web page or the like. A spoofing attack can attempt to acquire the user's login credentials by generating a spoofed login screen. For clients which communicate with the network via a wireless network connection, a sniffing attack can attempt to intercept the user's login credentials by being in close proximity to the client and passively monitoring the information being communicated over the wireless network. Sniffing attacks are all too common in Internet cafés which are popular throughout the world today.

Various software tools are available which can be used on the client to detect the presence of the aforementioned key-loggers, other types of viruses and malware, and phishing attacks. However, the presence of these tools on the client can typically be detected and thus, any protection they provide can be circumvented by a malicious party. Furthermore, some of these tools masquerade as protection software but in actuality are themselves malware which can compromise a client user's information security.

2.0 Login Authentication (LA) Using a Trusted Device

Generally speaking, the LA technique embodiments described herein involve using a trusted device which is in the control of a user to facilitate the user's remote login to a pre-established account on a secure server. In one embodiment the remote login takes place from a distrusted client. More particularly, a first secure connection is established between the client and server. Then, via communication between the trusted device and the client, a second secure connection is established between the trusted device and the server, where this second secure connection is tunneled within the first secure connection. Then, via further communication between the trusted device and the client, the trusted device is used to identify and authenticate the user to the server via a conventional password-based authentication protocol, where the user's secret login credentials are entered into the trusted device and then communicated from the trusted device to the server via the second, tunneled secure connection.

Once the user has been positively identified and authenticated by the secure server, a login session will be established between the server and the distrusted client's web browser, and the server will allow the client to access the server's web pages and/or online information services that are specifically sanctioned by the user's account. In this manner, the user remotely logs into to their account on the server and accesses its services from the client without the user's secret login credentials ever having to be displayed in plaintext on the client (i.e., they are entered using the trusted device). Thus, the user's login credentials are protected from being leaked to a malicious party. Furthermore, it is noted that anyone wishing to access a user account on the server must have access to and control the trusted device and must also know the login credentials for the account. Thus, if the user loses their trusted device to a malicious party, the malicious party will typically not also know the user's login credentials and therefore will be unable to access the user's account. Similarly, if the user's login credentials are leaked to a malicious party, the malicious party will typically not also have access to and control the user's trusted device and therefore will be unable to access the user's account.

The LA technique embodiments described herein are useful in a variety of different network-based, information service applications where a user wishes to remotely access a secure information service on a server. Examples of such applications include write-secure email, online financial account management, online bill-pay, e-cash-free credit-card-like payment systems where the trusted device is used like a credit card, and the like.

2.1 LA System Architecture

FIG. 1 illustrates a diagram of an exemplary embodiment, in simplified form, of a general architecture of a system for implementing the LA technique embodiments described herein. As depicted in FIG. 1, the system includes the following devices which generally operate in the following manner. A secure server 100 includes a database of user accounts (not shown) which are used to control user access to one or more secure web pages 124 and/or information services (not shown) residing on the server. The server 100 employs a conventional, certificate-based public key infrastructure (PKI) method to identify and authenticate itself to arbitrary client devices who want to access the server. A user 102 is working at a client 104 which includes a web browser 106, where the client is assumed to be distrusted. It is noted however that the LA technique embodiments are also operational in the case where the client 104 is trusted. The user 102 uses the client's browser 106 to communicate with the server 100 via a network 108 such as the Internet in order to remotely access one or more particular secure web page(s) 124 and/or online information services residing on the server. As described heretofore, it is assumed that the server 100 requires the user 102 to be positively identified and authenticated via a user login procedure before they are allowed to access the web page(s) 124 and information services it provides.

Referring again to FIG. 1, the distrusted client 104 includes a small trusted device connectivity application module 118 which interacts with the client's web browser 106 and provides the client and browser with the specialized functionality needed to operate in the manner described hereafter. In tested embodiments of the LA techniques described herein, the trusted device connectivity application 118 was downloaded to the client 104 by the secure server 100 and installed on the client in the manner described hereafter. It is noted however that alternate LA technique embodiments are possible in which the trusted device connectivity application 118 could be installed on the client 104 in any other suitable manner such as being programmed directly into the client's operating system (OS), being manually installed by the user 102, and the like.

Referring again to FIG. 1, in order to optimize the security of the user login procedure, a personal computing device which (a) includes a user interface supporting information display and data entry, (b) is in the user's 102 control, and (c) is trusted by the user (hereafter referred to simply as a trusted device 110), can be employed to facilitate the user login procedure. The trusted device can either be a mobile device or a non-mobile device. As will be described in more detail hereafter, the trusted device 110 includes a device identification (ID) code 126 which is used by the secure server 100 to authenticate the trusted device. The trusted device 110 also includes a client connectivity application module 132 which provides the trusted device with the specialized functionality needed to operate in the manner described hereafter.

In tested embodiments of the LA techniques described herein, a conventional mobile phone was employed as the trusted device 110 and the client connectivity application 132 was installed on the mobile phone via a conventional Subscriber Identity Module (SIM) card (not shown). Besides being cost-effectively available "off-the-shelf" from a wide range of manufacturers, a mobile phone is well suited to serve as the trusted device for a variety of different reasons, including but not limited to the following. Generally speaking, mobile phones are designed in a self-contained manner with an integrated display and keyboard. The software on a typical mobile phone is tightly controlled by the phone manufacturer and the service provider. Therefore, more radical intrusion management methods can be implemented in a mobile phone such as randomized instruction sets or intrusion prevention via code signing. Furthermore, in most mobile phones the hardware computing resources that handle the voice communication are isolated (i.e., "hidden") from the general-purpose programmable unit which hosts the mobile phone's OS and resident applications. These hidden computing resources can be used to implement security features that are not accessible by malware which might be installed on the programmable unit. Additionally, it is difficult for a malicious party to write robust malware for a mobile phone since the software development kits available for embedded OSs such as those used in a mobile phone typically do not fully support the features of the OS.

It is noted that alternate LA technique embodiments are possible in which other types of personal computing devices could be employed as the trusted device 110. Exemplary suitable other types of personal computing devices include a pocket PC, an ultra-mobile PC, a mobile music player, an intelligent keypad and the like. Alternate LA technique embodiments are also possible in which the client connectivity application 132 could be installed on the trusted device 110 in any other suitable manner such as being implemented directly within the trusted device's OS.

Referring again to FIG. 1, the trusted device 110 and the distrusted client's web browser 106 communicate via a near-field communication channel 112 which could be any appropriate wired or wireless, point-to-point or multi-point connection which is supported there-between. In tested embodiments of the LA techniques described herein, a conventional wireless Bluetooth connection was employed for the communication channel 112. In another exemplary embodiment, a conventional wired Universal Serial Bus (USB) connection could be employed for the communication channel 112. It is noted that additional embodiments are also possible which employ any other suitable type of network or connection for the communication channel 112.

2.2 LA Protocol

Figure 2A:
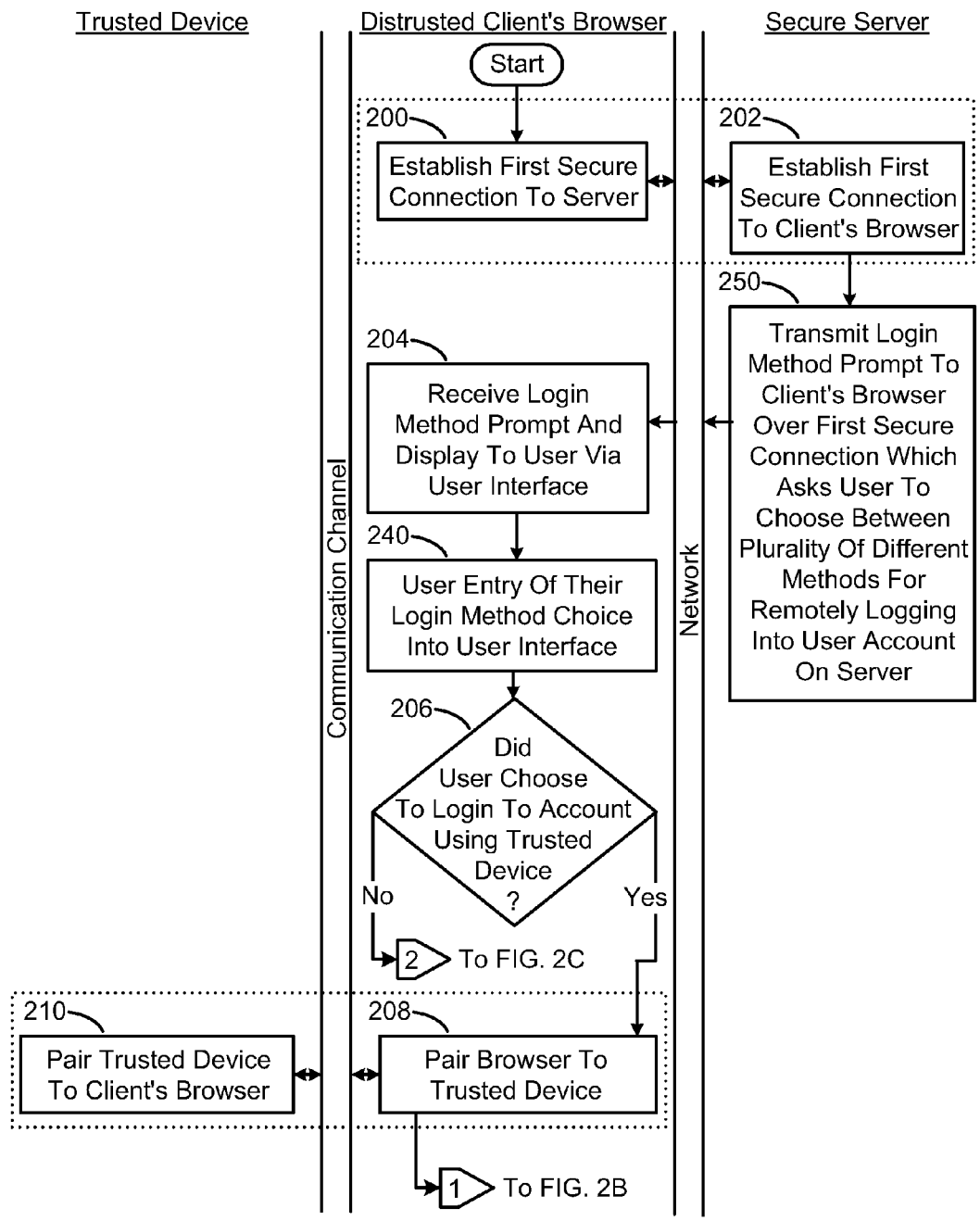
FIGS. 2A-2C illustrate a flow diagram of an exemplary embodiment, in simplified form, of a process for a user remotely logging into their account on a secure server from a distrusted client using a trusted device which is in the user's control.
Figure 2B:
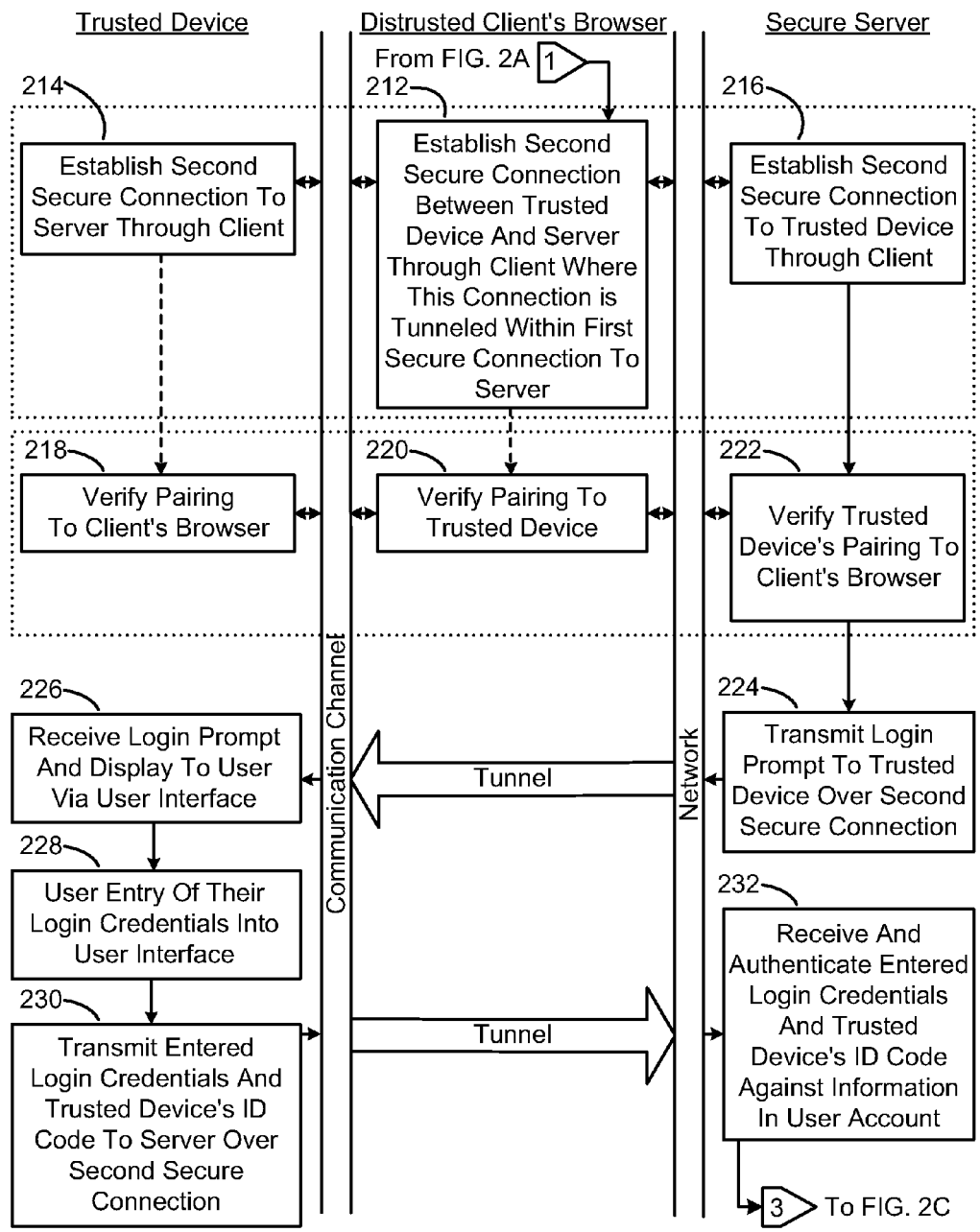
Figure 2C:
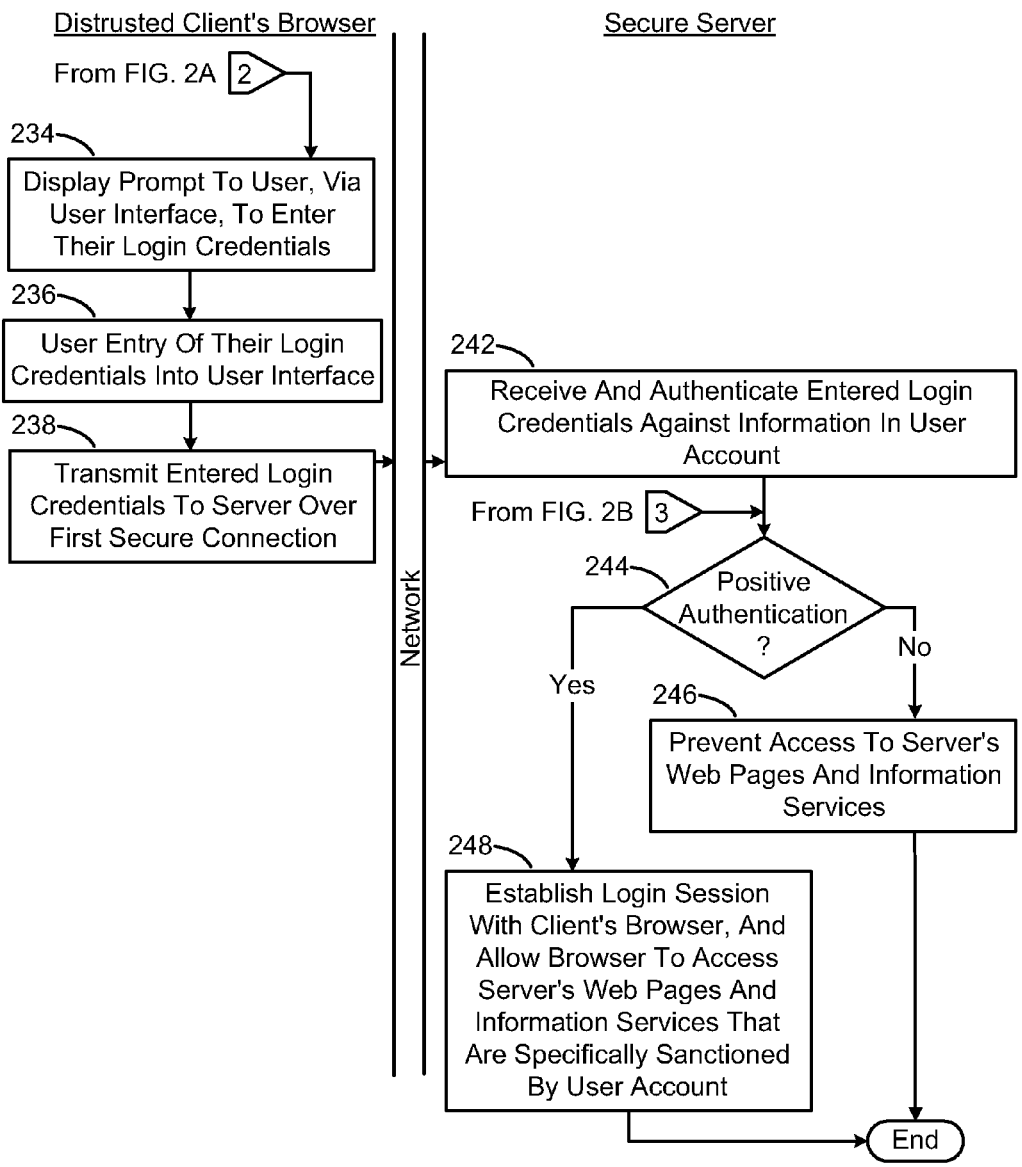

FIGS. 2A-2C illustrate a flow diagram of an exemplary embodiment, in simplified form, of a process for allowing a user to remotely login to a user account on a secure server from a distrusted client using a trusted device which is in the user's control. As depicted in FIG. 2A and referring again to FIG. 1, the process begins with the user 102 utilizing the client's 104 web browser 106 to establish a first secure connection 120 between the client's browser and the server 100 over the network 108 that interconnects the client and server (process actions 200 and 202). In tested embodiments of the LA techniques described herein, a conventional Secure Sockets Layer (SSL) protocol was employed to implement the first secure connection 120. Alternate embodiments are also possible which employ other suitable protocols to implement the first secure connection 120 such as a conventional Transport Layer Security (TLS) protocol and the like. It is noted that a simple version of these protocols is used where only the server is authenticated (i.e., it is not necessary to authenticate the client or the trusted device).

Referring again to FIGS. 1 and 2A, the server hosts one or more secure web pages 124 and/or one or more online information services that the user wants to access. The particular manner in which the first secure connection 120 is established will be described hereafter. The server 100 then transmits a login method prompt message to the client's browser 106 over the first secure connection 120, where this message asks the user 102 to choose between a plurality of different methods for remotely logging into the user account on the server (process action 250). The client's browser 106 then receives the login method prompt message and displays it to the user 102 via the user interface of the client 104 (process action 204). As is appreciated in the art of computing systems, the login method prompt message includes a login method web page (not shown) which includes a user-selectable list of possible login methods from which the user then chooses a desired login method. In tested embodiments of the LA techniques described herein, the possible login methods included logging in using only the client's browser 106, and logging in using the trusted device 110 which is in the user's control.

Referring again to FIGS. 1, 2A and 2C, upon the user's 102 entry of their login method choice into the user interface of the distrusted client 104 (process action 240), in the case where the user chooses not to remotely login to the user account on the secure server 100 using the trusted device 110 (process action 206), the server then prompts the user to enter their secret login credentials via the user interface of the client (process action 234). As is appreciated in the art of computing systems, this prompting is accomplished by the server 100 providing the client's web browser 106 with a login web page (not shown) which is displayed to the user 102 on the client 104, where this login web page includes fields for the user to enter their login credentials. In tested embodiments of the LA techniques described herein, a username and a password were employed as the user's 102 login credentials. However, it is noted that other embodiments (not shown) of the LA techniques are also possible which employ either additional or different types of information for the user's 102 login credentials such as a biometric template which is scanned from the user and the like. Upon the user's 102 entry of their login credentials into the user interface of the client 104 (process action 236), the client's browser 106 transmits the entered login credentials to the server 100 over the first secure connection 120 (process action 238). The server 100 then receives the entered login credentials and authenticates them against information in the user account (process action 242).

Referring again to FIGS. 1 and 2C, in the case where the secret login credentials entered by the user 102 into the user interface of the distrusted client 104 are positively authenticated by the secure server 100 against information in the user account (process action 244), a login session will be established between the server and the client's web browser 106, and the server will allow the client's browser to access the server's web pages 124 and/or information services that are specifically sanctioned by the user account (process action 248). In the case where the login credentials entered by the user 102 into the user interface of the client 104 are not positively authenticated by the server 100 against information in the user account (process action 244), no login session will be established and the server will prevent the client's browser 106 from accessing the server's web pages 124 and information services (process action 246).

Referring again to FIGS. 1, 2A and 2B, in the case where the user 102 chooses to remotely login to the user account on the secure server 100 using the trusted device 110 (process action 206), the distrusted client's web browser 106 is then paired to the trusted device (process actions 208 and 210). The particular manner in which the client's browser 106 is paired to the trusted device 110 will be described hereafter. It is assumed that the client 104 and its browser 106 are previously unknown to the trusted device 110 (i.e., the client/browser have never been paired). A second secure connection 122 is then established between the trusted device 110 and the server 100 through the client 104, where this second secure connection is tunneled within the first secure connection 120 (process actions 212, 214 and 216) using a conventional tunneling protocol. In tested embodiments of the LA techniques described herein, the aforementioned SSL protocol was employed to implement the second secure connection 122. Alternate embodiments are also possible which employ other suitable protocols to implement the second secure connection 122 such as the aforementioned TLS protocol and the like. The particular manner in which the second secure connection 122 is established will be described hereafter.

Referring again to FIGS. 1 and 2B, the trusted device's 110 pairing to the distrusted client's web browser 106 is then verified in order to make sure that the physical trusted device in the user's control is connected to the desired physical client 104 (process actions 218, 220 and 222). The particular manner in which this pairing verification is performed will be described hereafter. It is noted that this pairing verification is useful in LA technique embodiments where the communication channel 112 employed cannot guarantee that the trusted device 110 is paired to the desired physical client 104, such as the aforementioned tested embodiments in which a conventional wireless Bluetooth connection was employed for the communication channel. In such situations, it is possible for a malicious party to spoof the aforementioned pairing process and pair the trusted device 110 to a malicious client (not shown) without the user's 102 knowledge.

Referring again to FIGS. 1 and 2B, the secure server 100 then transmits a login prompt message to the trusted device 110 over the second secure connection 122 (process action 224), where this message asks the user 102 to enter their secret login credentials. The trusted device 110 then receives this message and displays it to the user 102 via a user interface of the trusted device (process action 226). As is appreciated in the art of computing systems, the login prompt message includes a login web page 116 which includes fields for the user to enter their login credentials. As described heretofore, in tested embodiments of the LA techniques described herein, a username 128 and password 130 were employed as the user's 102 login credentials. However, as also described heretofore, it is noted that other embodiments (not shown) of the LA techniques are also possible which employ either additional or different types of information for the user's login credentials.

Referring again to FIGS. 1, 2B and 2C, upon the user 102 entering their secret login credentials 128/130 into the user interface of the trusted device 110 (process action 228), the entered login credentials and the trusted device's aforementioned device ID code 126 are transmitted from the trusted device to the secure server 100 through the distrusted client 104 over the second secure connection 122 (process action 230). The entered login credentials 128/130 and trusted device's ID code 126 are then received by the server and authenticated by the server against information in the user account (process action 232). In the case where the login credentials 128/130 entered by the user 102 into the user interface of the trusted device 110 and the trusted device's ID code 126 are positively authenticated by the server 100 against information in the user account (process action 244), a login session will be established between the server and the client's web browser 106, and the server will allow the client's browser to access the server's web pages 124 and/or information services that are specifically sanctioned by the user account (process action 248). From this point on, since all data displayed on the user interface of the client 104 could potentially be sniffed by a malicious party or seen by a malicious party who is in close proximity to the client, the server 100 will "anonymize" sensitive information it sends to the client's browser 106 in such a way that a malicious party cannot determine the information. As is appreciated in the art of computing systems, an exemplary method for anonymizing sensitive information is to insert one or more asterisks in the place of prescribed characters when the information is displayed. In the case where the login credentials 128/130 entered by the user 102 into the user interface of the trusted device 110 and the trusted device's ID code 126 are not positively authenticated by the server 100 against information in the user account (process action 244), no login session will be established and the server will prevent both the trusted device and client's browser 106 from accessing the server's web pages 124 and information services (process action 246).

Figure 3A:
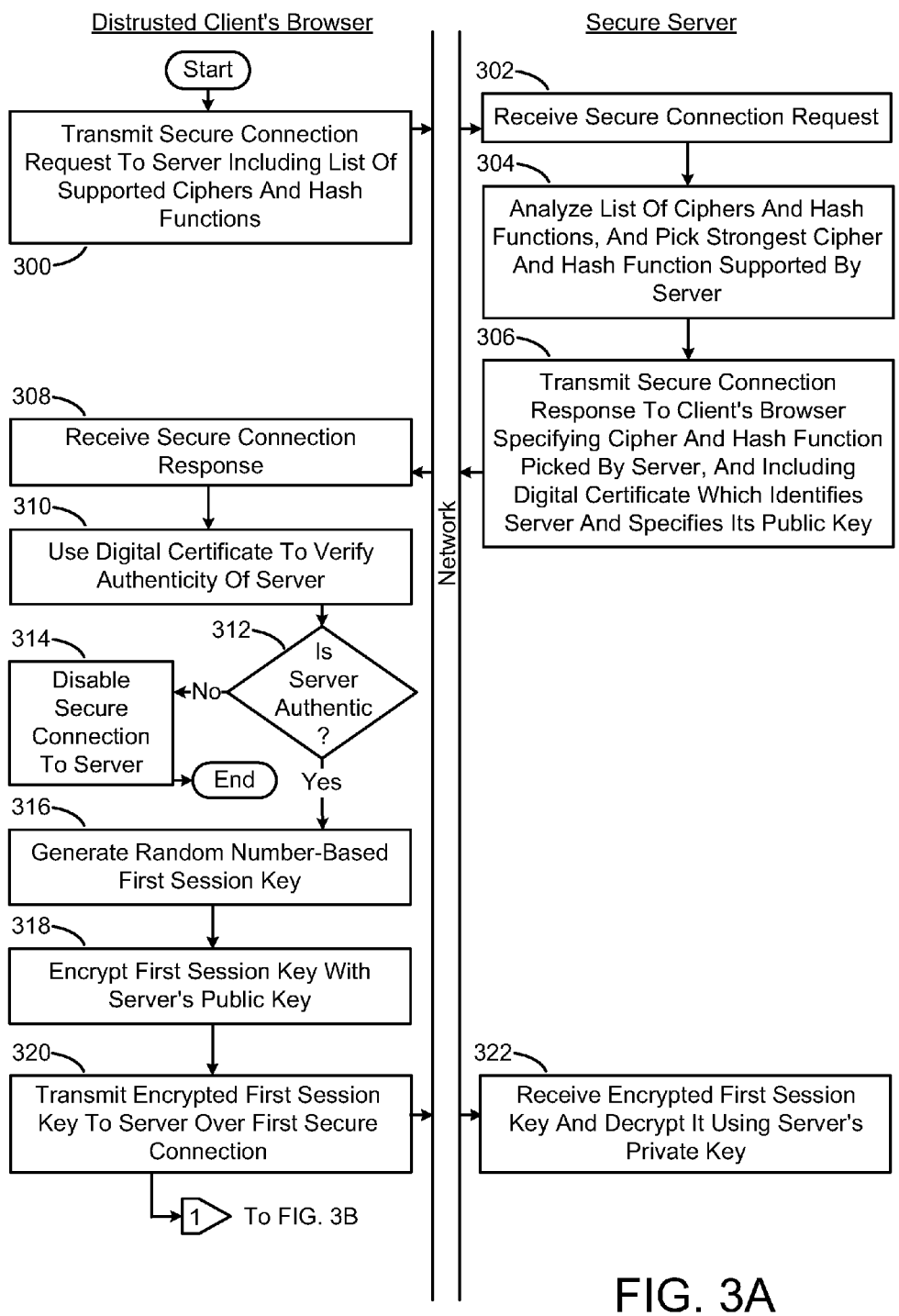
FIGS. 3A and 3B illustrate a flow diagram of an exemplary embodiment of a process for establishing a first secure connection between the client's web browser and the server.
Figure 3B:
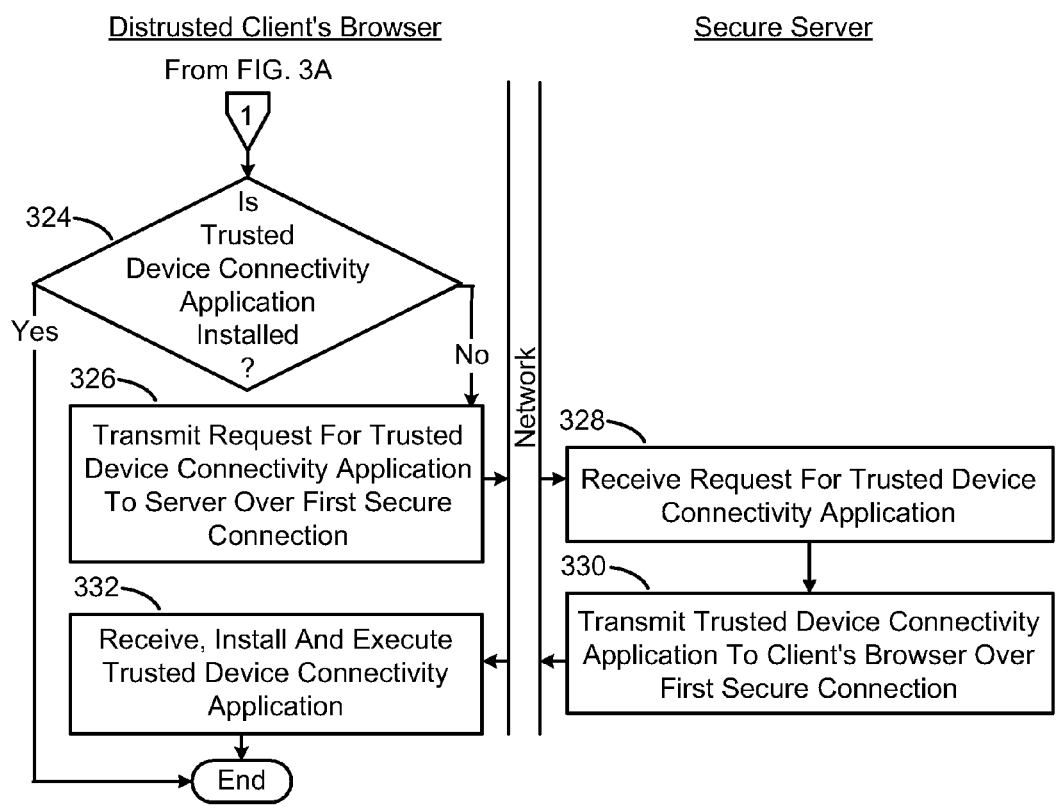

FIGS. 3A and 3B illustrate a flow diagram of an exemplary embodiment of a process for establishing the first secure connection between the distrusted client's web browser and the secure server. As depicted in FIG. 3A, the process begins with the client's browser transmitting a secure connection request message over the network to the server, where this message includes a list of ciphers and hash functions that are supported by the client's browser 300. The server then receives the secure connection request message 302, analyzes the list of ciphers and hash functions, and picks the strongest cipher and hash function from the list that are supported by the server 304. The server then transmits a secure connection response message over the network to the client's browser, where this response message specifies the cipher and hash function that were picked by the server, and also includes a digital certificate which identifies the server and specifies its public key 306. The client's browser then receives the secure connection response message 308, and uses the digital certificate to verify the authenticity of the server 310. In the case where the server is determined by the client's browser to be unauthentic 312, the client's browser disables the first secure connection between itself and the server 314, thus preventing any malicious activity from occurring on the client.

As depicted in FIGS. 3A and 3B, in the case where the secure server is determined by the distrusted client's web browser to be authentic 312, the client's browser generates a random number-based first session key 316, encrypts the first session key with the server's public key 318, and transmits the encrypted first session key to the server over the first secure connection 320. The server then receives the encrypted first session key and decrypts it using the server's private key 322. As is appreciated in the art of cryptographic keys, this first session key is a symmetric session key which is used by both the client's browser and the server to encrypt information which is transmitted over the first secure connection and decrypt information which is received from the first secure connection. The first session key is hidden from malicious parties since only the server knows the private key needed to decrypt the encrypted first session key that is generated by the client's browser.

Referring again to FIG. 3B, if the aforementioned trusted device connectivity application module is not installed on the distrusted client 324, the client's browser then transmits a message requesting this application to the secure server over the first secure connection 326. The server then receives this request message 328 and transmits the requested application to the client's browser over the first secure connection 330. The client's browser then receives, installs and executes the requested application 332.

Figure 4:
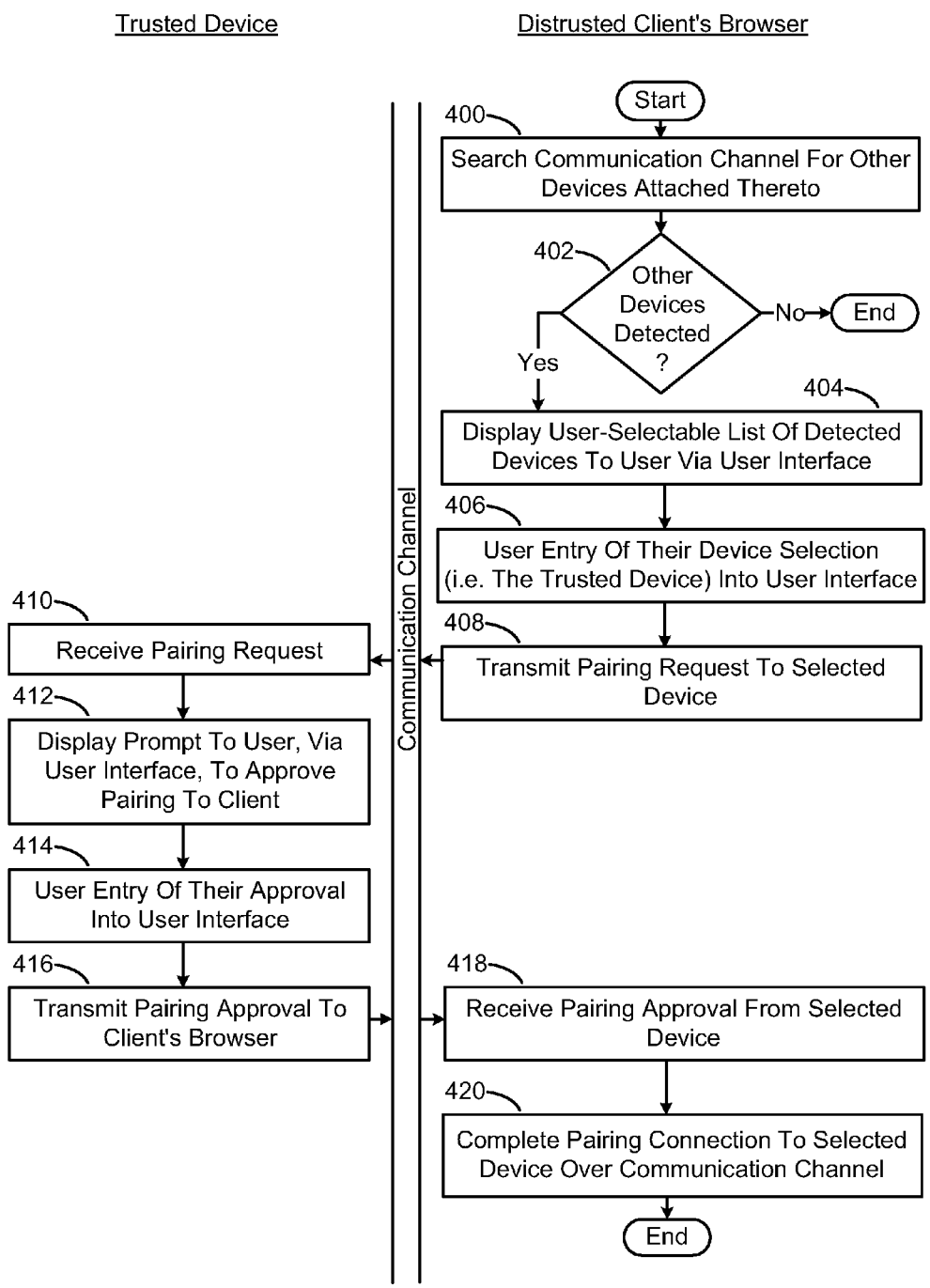
FIG. 4 illustrates a flow diagram of an exemplary embodiment of a process for pairing the client's browser to the trusted device.

FIG. 4 illustrates a flow diagram of an exemplary embodiment of a process for pairing the distrusted client's web browser to the trusted device. It is noted that this process assumes the aforementioned trusted device connectivity application module is installed and executing on the client. This process also assumes that the aforementioned client connectivity application module is installed and executing on the trusted device. These assumptions are also made for each of the processes that are described hereafter.

As depicted in FIG. 4, the process begins with the distrusted client's web browser searching the near-field communication channel for other devices which are attached thereto 400. In the case where the client's browser detects that there are one or more other devices (including the trusted device) attached to the communication channel 402, the client's browser displays a user-selectable list of the detected devices to the user via the client's user interface 404. Upon the user's entry of their device selection into the user interface of the client 406 (in this case the user would select the trusted device), the client's browser transmits a pairing request message to the selected device (i.e., to the trusted device) over the communication channel 408. The trusted device then receives the pairing request message 410 and displays a prompt to the user via its user interface to approve pairing the trusted device to the client 412. Upon the user's entry of their approval into the user interface of the trusted device 414, the trusted device transmits a pairing approval message to the client's browser over the communication channel 416. The client's browser then receives the pairing approval message from the selected device (i.e., from the trusted device) 418 and completes a pairing connection to the selected device over the communication channel 420. It is noted that in the aforementioned tested embodiments of the LA techniques in which a conventional wireless Bluetooth connection was employed for the communication channel, the client's browser searches for compatible Bluetooth devices which are in its vicinity and employs the Bluetooth pairing protocol.

Figure 5A:
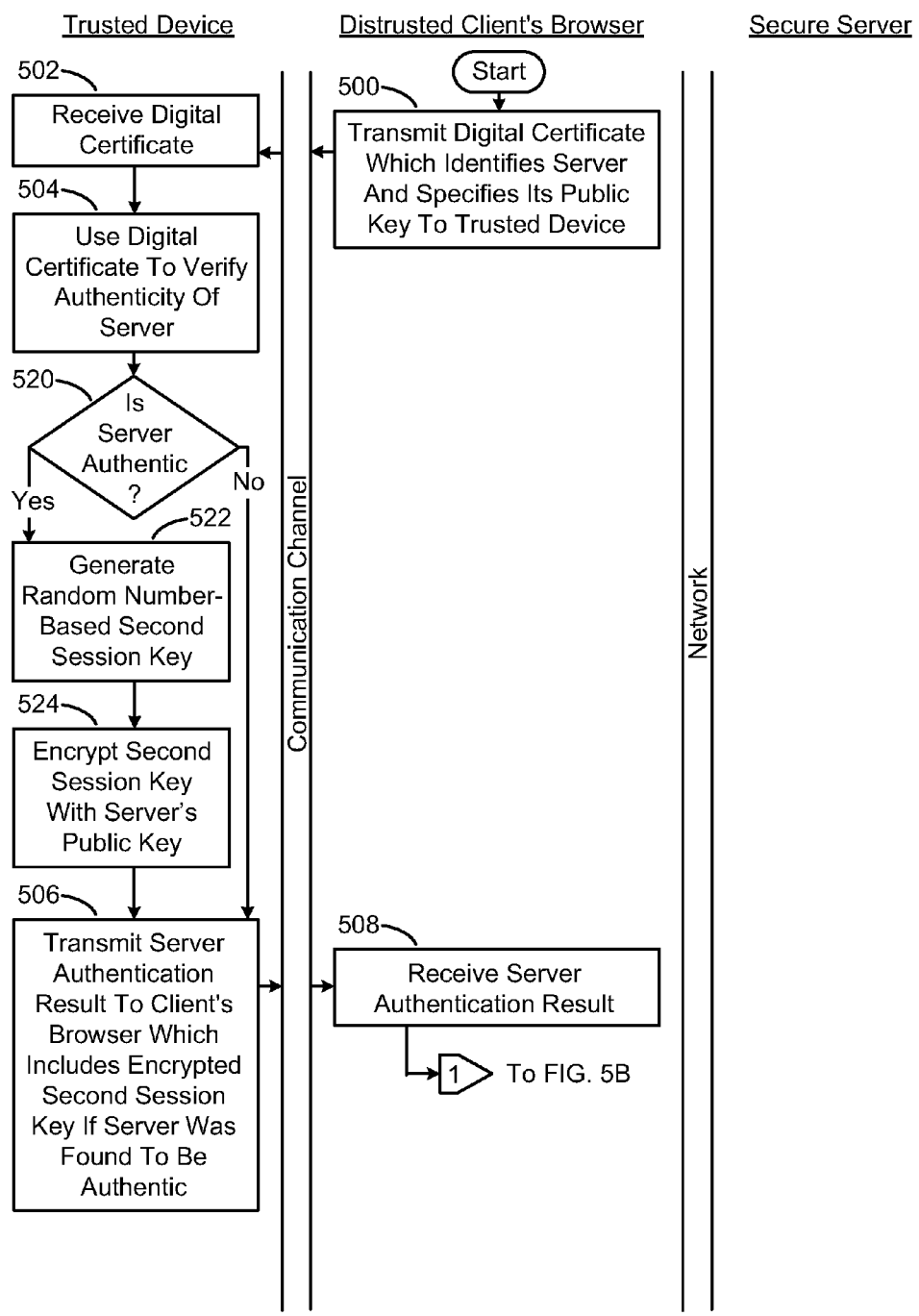
FIGS. 5A and 5B illustrate a flow diagram of an exemplary embodiment of a process for establishing a second secure connection between the trusted device and the server through the client.
Figure 5B:
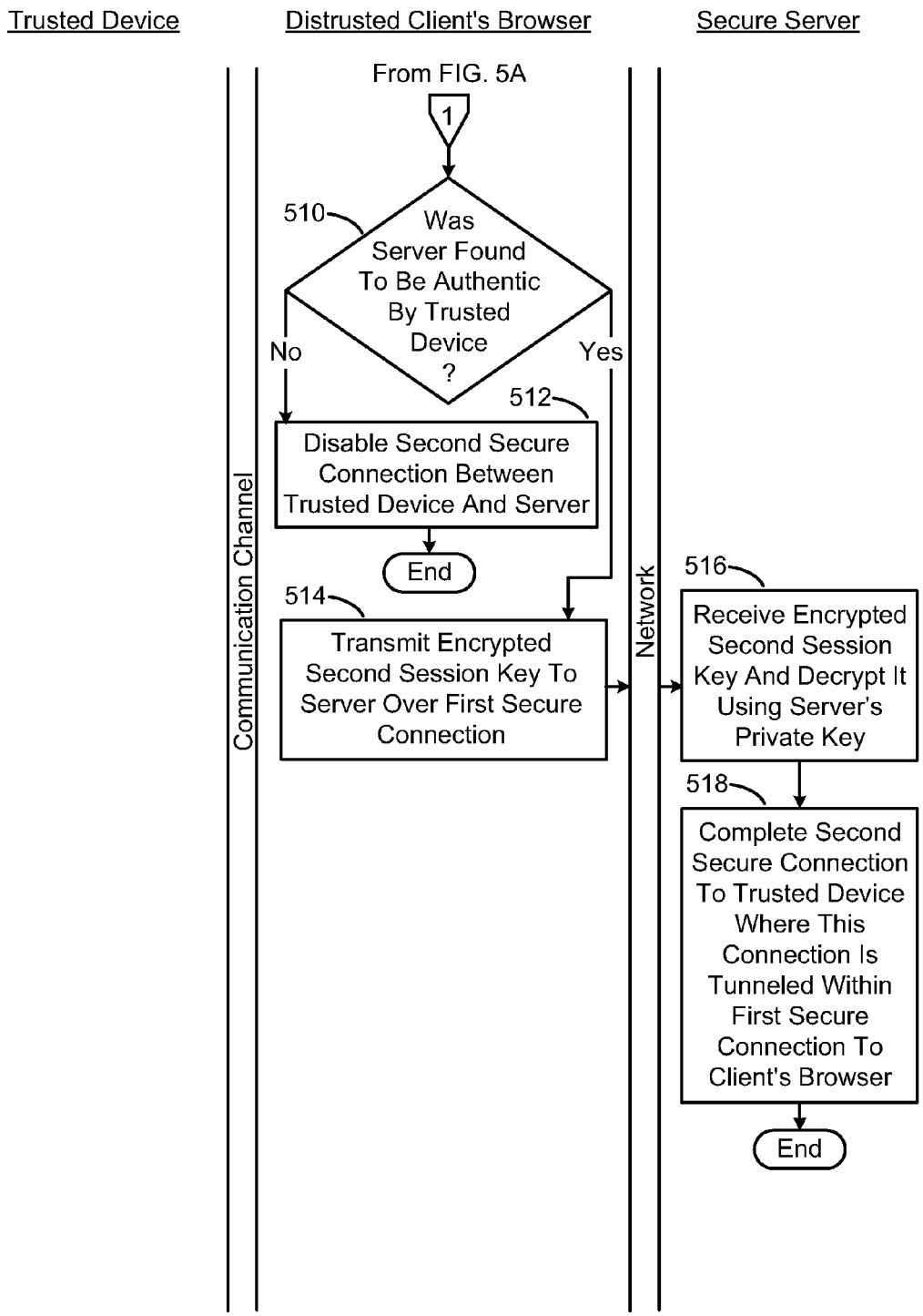

FIGS. 5A and 5B illustrate a flow diagram of an exemplary embodiment of a process for establishing the second secure connection between the trusted device and the secure server through the distrusted client. As depicted in FIG. 5A, the process begins with the client's web browser transmitting the digital certificate which identifies the server and specifies its public key to the trusted device 500. The trusted device then receives the digital certificate 502 and uses it to verify the authenticity of the server 504. In the case where the server is determined by the trusted device to be authentic 520, the trusted device generates a random number-based second session key 522, encrypts the second session key with the server's public key 524, and transmits a server authentication result message to the client's browser which specifies that the server was found to be authentic and includes the encrypted second session key 506. In the case where the server is determined by the trusted device to be unauthentic 520, the trusted device will simply transmit a server authentication result message to the client's browser which specifies that the server was found to be unauthentic 506.

Referring again to FIG. 5A and as depicted in FIG. 5B, upon the distrusted client web browser's receipt of the server authentication result message 508, in the case where this message specifies that the server was determined by the trusted device to be unauthentic 510, the client's browser disables the second secure connection between the trusted device and the server 512, thus preventing any malicious activity from occurring on the trusted device. In the case where the server authentication result message specifies that the server was found by the trusted device to be authentic 510 and this message includes the encrypted second session key, the client's browser transmits the encrypted second session key to the server over the first secure connection 514. The server then receives the encrypted second session key and decrypts it using the server's private key 516. The server then completes the second secure connection to the trusted device 518, where this connection is tunneled within the first secure connection to the client's browser. As is appreciated in the art of cryptographic keys, the second session key is a symmetric session key which is used by both the trusted device and the server to encrypt information which is transmitted over the second secure connection and decrypt information which is received from the second secure connection. The second session key is hidden from malicious parties since only the server knows the private key needed to decrypt the encrypted second session key that is generated by the trusted device.

Figure 6:
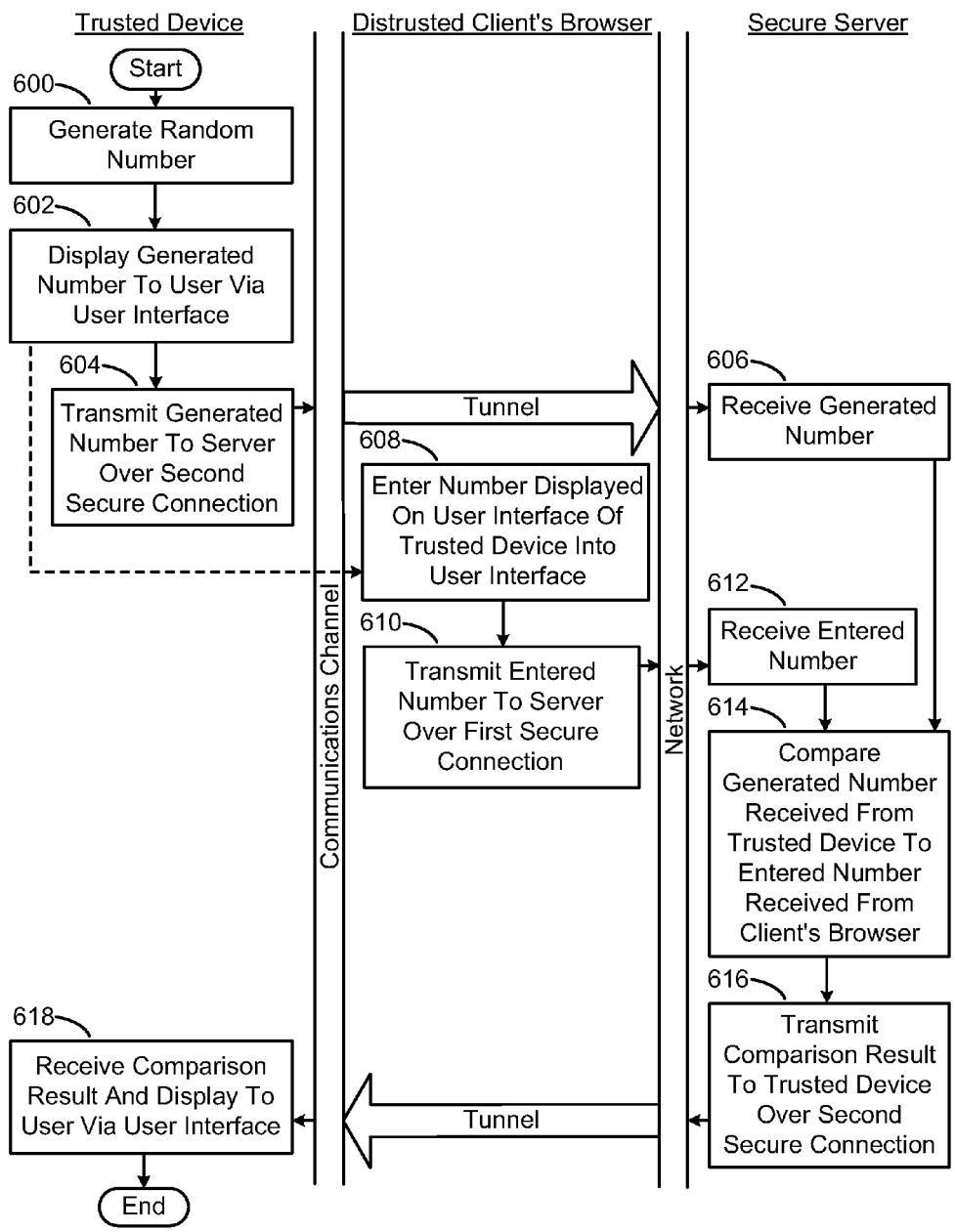
FIG. 6 illustrates a flow diagram of one embodiment of a process for verifying the trusted device's connection to the client's browser.

FIG. 6 illustrates a flow diagram of one embodiment of a process for verifying the trusted device's connection to the distrusted client's web browser. As depicted in FIG. 6, the process begins with the trusted device generating a large random number 600. The trusted device then displays the generated number to the user via its user interface 602 and transmits the generated number to the secure server over the second secure connection 604. The user then reads the generated number displayed on the trusted device and enters it into the user interface of the client 608. The client's browser then transmits the entered number to the server over the first secure connection 610. The server then receives the generated number transmitted from the trusted device 606 and the entered number transmitted from the client's browser 612, and compares these two received numbers 614. The server then transmits a comparison result message to the trusted device over the second secure connection 616, where this message specifies whether or not the generated number transmitted from the trusted device matches the entered number transmitted from the client's browser. The trusted device receives the comparison result message and displays it to the user via the user interface of the trusted device 618. If the message displayed on the trusted device indicates that the server successfully matched the two numbers, this tells the user that the physical trusted device in their control is connected to the desired physical client they are working at, and they can continue to use the client to login to the server. If the message displayed on the trusted device indicates that the server did not successfully match the two numbers, this tells the user that the physical trusted device in their control is not connected to the desired physical client they are working at, and they should cease working on the client.

Figure 7:
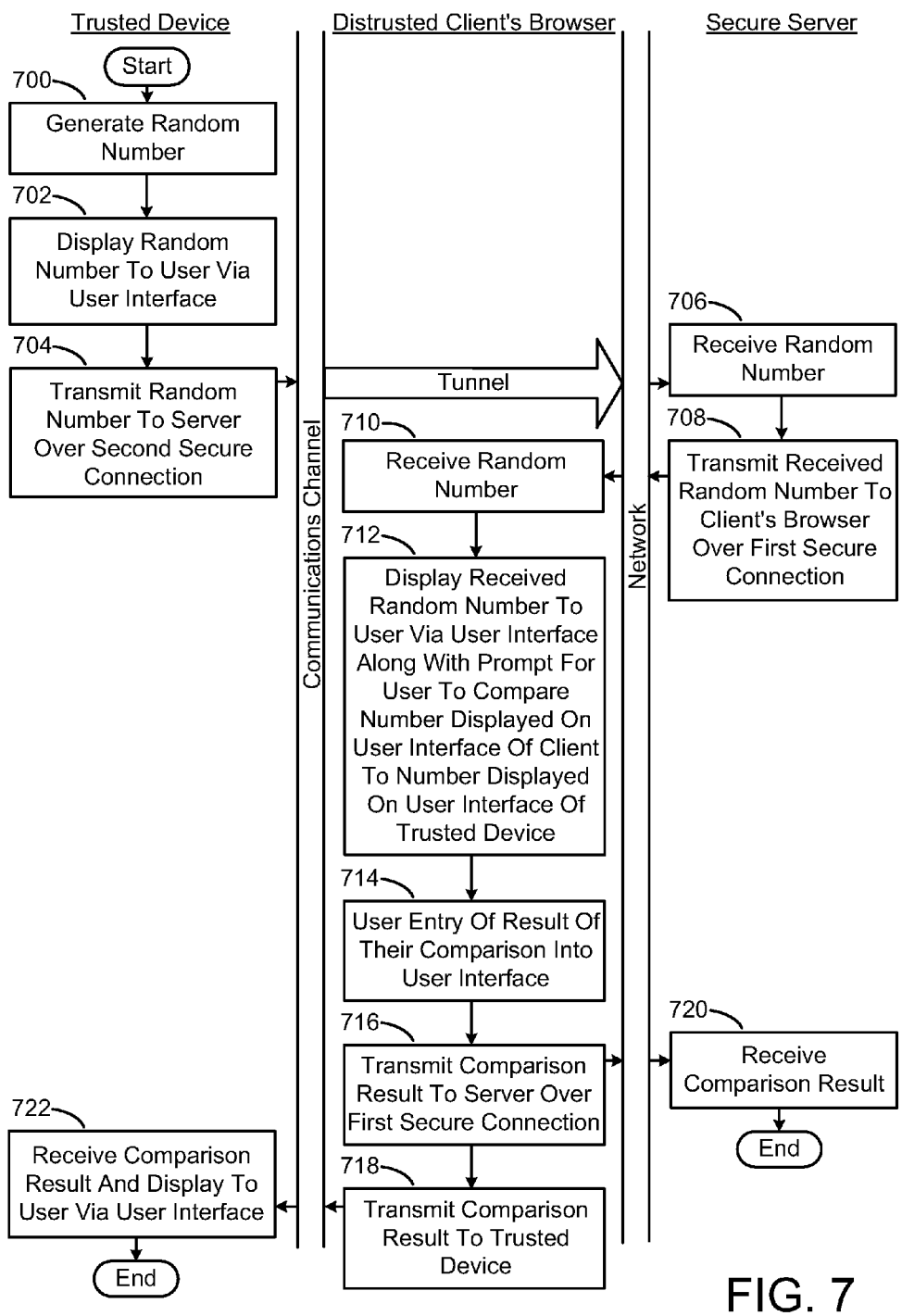
FIG. 7 illustrates a flow diagram of another embodiment of the process for verifying the trusted device's connection to the client's browser.

FIG. 7 illustrates a flow diagram of another embodiment of the process for verifying the trusted device's connection to the distrusted client's web browser. As depicted in FIG. 7, the process begins with the trusted device generating a large random number 700. The trusted device then displays the random number to the user via its user interface 702 and transmits the random number to the secure server over the second secure connection 704. The server then receives the random number transmitted from the trusted device 706 and transmits it to the client's browser over the first secure connection 708. The client's browser receives the random number transmitted from the server 710 and displays it to the user via the user interface of the client along with a prompt for the user to visually compare the number displayed on the user interface of the client to the number displayed on the user interface of the trusted device 712. The user then visually compares the two displayed numbers and enters the result of their comparison into the user interface of the client 714. The client's browser then transmits a comparison result message to the server over the first secure connection 716 which the server then receives 720, where this message specifies whether or not the number displayed on the user interface of the client matches the number displayed on the user interface of the trusted device. The client's browser also transmits the comparison result message to the trusted device over the communication channel 718 which the trusted device then receives and displays to the user via the user interface of the trusted device 722. If the message displayed on the trusted device indicates that the number displayed on the user interface of the client matches the number displayed on the user interface of the trusted device, this tells the user that the physical trusted device in their control is connected to the desired physical client they are working at, and they can continue to use the client to login to the server. If the message displayed on the trusted device indicates that the number displayed on the user interface of the client does not match the number displayed on the user interface of the trusted device, this tells the user that the physical trusted device in their control is not connected to the desired physical client they are working at, and they should cease working on the client.

Figure 8:
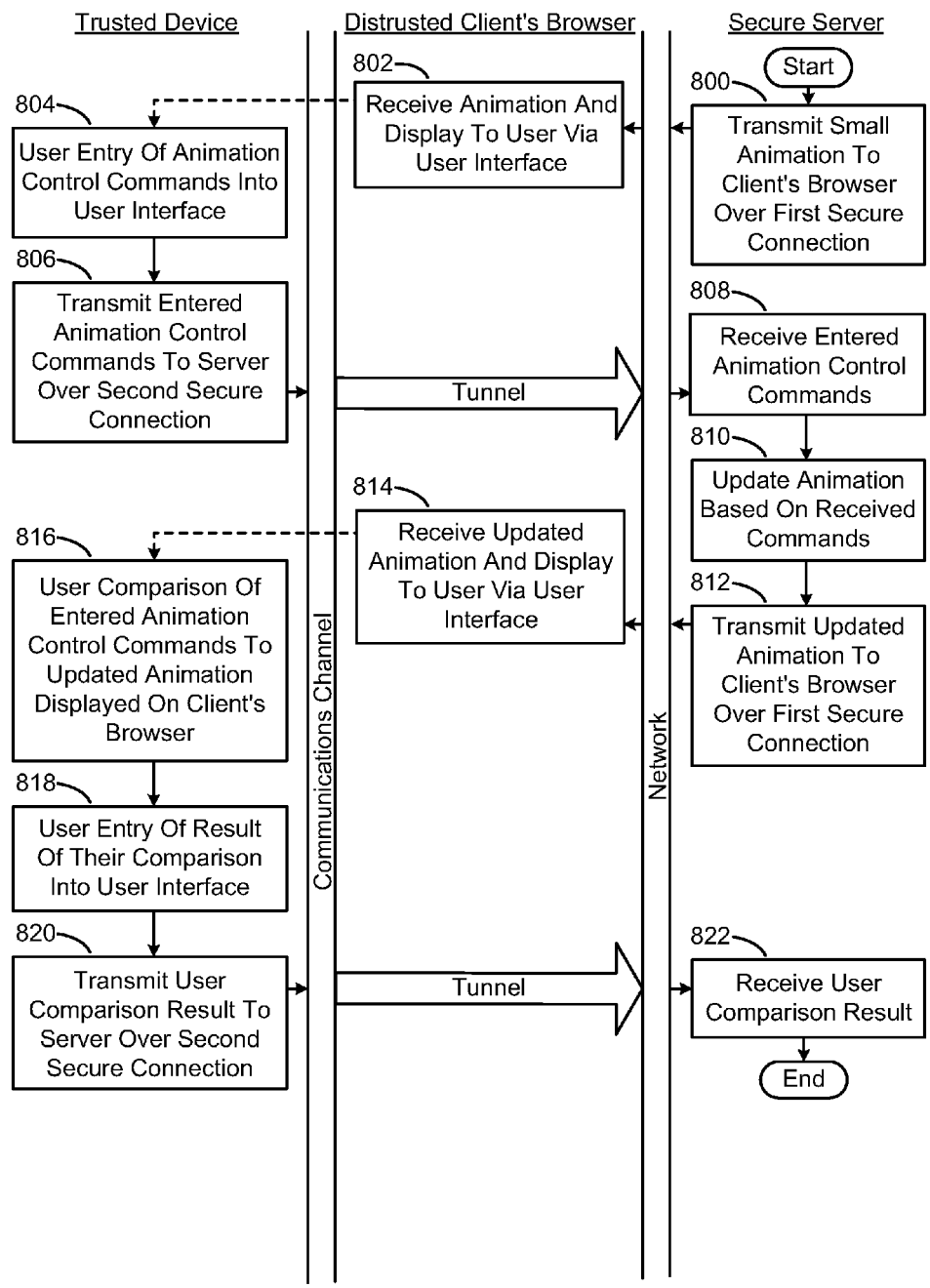
FIG. 8 illustrates a flow diagram of yet another embodiment of the process for verifying the trusted device's connection to the client's browser.

FIG. 8 illustrates a flow diagram of yet another embodiment of the process for verifying the trusted device's connection to the distrusted client's web browser. As depicted in FIG. 8, the process begins with the secure server transmitting a small animation to the client's browser over the first secure connection 800. In tested embodiments of the LA techniques described herein, a conventional frogger game was employed for the animation. It is noted however that alternate LA technique embodiments are possible in which employ any other suitable user-controllable games or animations for the animation. The client's browser then receives the animation and displays it to the user via the user interface of the client 802. The user then enters animation control commands into the user interface of the trusted device 804. The entered animation control commands are then transmitted from the trusted device to the server over the second secure connection 806. The server then receives the entered animation control commands 808, updates the animation accordingly based on the received commands 810, and transmits the updated animation to the client's browser over the first secure connection 812. The client's browser then receives the updated animation and displays it to the user via the user interface of the client 814. The user then visually compares the animation control commands they entered into the user interface of the trusted device to the updated animation displayed on the client's browser 816 in order to determine if their control commands match the updated animation. If the user's control commands match the updated animation, this tells the user that the physical trusted device in their control is connected to the desired physical client they are working at, and they can continue to use the client to login to the server. If the user's control commands do not match the updated animation, this tells the user that the physical trusted device in their control is not connected to the desired physical client they are working at, and they should cease working on the client. The user then enters the result of their visual comparison (i.e., whether or not their entered control commands match the updated animation) into the user interface of the trusted device 818. The trusted device then transmits a user comparison result message to the server over the second secure connection 820, where this message specifies whether or not the user's entered control commands match the updated animation. The server then receives the user comparison result message 822.

2.3 Verification of Data Writes to Server and Data Reads from Server

Referring again to FIG. 2C, in an optional embodiment of the LA techniques described herein, once the secure server positively authenticates the user's secret login credentials that were entered into the trusted device and the trusted device's ID code against information in the user's account on the server 232/244, a login session is established between the server and the distrusted client's web browser. The client's browser is then allowed to access the server's web pages and/or information services that are specifically sanctioned by the user's account 248. All data writes to the server which are initiated by the client's browser can be verified at the trusted device in the following manner. Whenever the server receives a data write request from the client's browser over the first secure connection, the server would transmit a message to the trusted device over the second secure connection requesting that the user explicitly approve the data write via the user interface of the trusted device. The trusted device would then receive this message and display it to the user on the user interface of the trusted device. Upon the user's entry of their approval of the data write into the user interface of the trusted device, the trusted device would transmit a data write approval message to the server over the second secure connection. The server would then receive the data write approval message and allow the data write to be completed. Exemplary data writes for which this verification is crucial include money transfers, stock transactions, bill payments and the like. This verification of data writes to the server provides security protection against the situation where a malicious party gains control of the client's browser and initiates an automated attempt to access the server's information services.

In another optional embodiment of the LA techniques described herein, once a login session is established between the secure server and the distrusted client's web browser, and the client's browser is allowed to access the secure server's web pages and/or information services that are specifically sanctioned by the user's account, the user can request that particular web pages (or parts of particular web pages) received from the server (i.e., particular data read from the server) over the first secure connection be forwarded by the server to the trusted device over the second secure connection for content verification by the user. These content verification requests would be handled by a simple AJAX (asynchronous JavaScript and Extensible Markup Language) script which is implemented within the web pages. This embodiment addresses the situation where the client is being controlled by the aforementioned malicious ghost user interface application which could trick the user into performing an undesirable action on the client by displaying false information to the user on the user interface of the client (e.g., displaying a false stock price, displaying a false message indicating that a credit card transaction is required, and the like).

In yet another optional embodiment of the LA techniques described herein, once a login session is established between the secure server and the distrusted client's web browser, and the client's browser is allowed to access the secure server's web pages and/or information services that are specifically sanctioned by the user's account, the server can employ a conventional human interactive proofs (HIPs) method to verify each "potentially suspect" action initiated by the client's browser on the server. Examples of such suspect actions include money transfers, stock transactions, bill payments and the like. The HIPs would be transmitted from the server over the first secure connection to the client's browser, and also over the second secure connection to the trusted device. The HIPs would then be displayed on the user interface of both the client's browser and the trusted device. The user would then to enter an appropriate response to the HIPs into the user interface of both the client and trusted device. The user's entered HIPs response would then be transmitted from the client's browser over the first secure connection to the server and from the trusted device over the second secure connection to the server. The server would then receive both HIPs responses and if they are correct, allow the suspect action to be completed. This HIPs verification of suspect actions on the server also provides security protection against the situation where a malicious party gains control of the client's browser and initiates an automated attempt to access the server's information services.

2.4 Trusted Device Pre-Registration and Revocation

Referring again to FIG. 1, this section described various ways in which the user's 102 trusted device 110 is pre-registered in the user's account on the secure server 100. Generally speaking the trusted device's 110 ID code 126 is a long number particular to the trusted device which is permanently stored in the trusted device and is also stored in the user account on the server 100. The purpose of the trusted device ID code 126 is to assure that the server's web pages 124 and/or information services that are specifically sanctioned by the user account are accessed only by a user 102 who knows the secret login credentials 128/130 for the account, and also has in their control a trusted device 110 which has been pre-registered in the account by the user. In one embodiment of the LA techniques described herein, the ID code 126 for the trusted device 110 can be permanently hardwired inside the device when it is manufactured. In this case, the user 102 would pre-register the trusted device 110 in their account on the server 100 in the following manner. The user 102 would login to their account on the server 100 from a trusted client (not shown) over a secure connection using their login credentials 128/130. The user would then visually read the trusted device's ID code 126 from the user interface of the trusted device 110 and enter the ID code into the user interface of the trusted client. The trusted client would then transmit the ID code 126 over the secure connection to the server 100, and the server would then store the ID code in the user's account.

Generally speaking, other embodiments of the LA techniques described herein are possible where the ID code for the trusted device is not permanently hardwired inside the device. Rather, the trusted device's ID code would be permanently stored in the device upon the user's pre-registration of the device in their account on the secure server. More particularly, in an exemplary embodiment, after the user's login to their account on the server from a trusted client over a secure connection using their login credentials, the server would generate a long random number for the trusted device which is particular to the trusted device, store it in the user's account, and transmit it to the trusted device for permanent storage therein.

It is noted that in one embodiment of the LA techniques described herein, the user can choose to pre-register only a single trusted device in their account on the server. In an alternate embodiment the user can choose to pre-register a plurality of trusted devices in their account, where each trusted device has a different ID code stored therein.

In the event that a trusted device is pre-registered in a user's account on the server, and then the device is lost, stolen and/or compromised by a malicious party in some manner, the user would revoke the device's registration in their account by making a phone call to a customer service center (typically via a 1-800 phone number). The user would authenticate themselves to the service center by providing their secret login credentials and then the service center would remove the device's ID code from the user's account. The user could then pre-register a new trusted device in their account using any of the techniques described heretofore.

3.0 Additional Embodiments

While the LA techniques have been described in detail by specific reference to embodiments thereof, it is understood that variations and modifications thereof can be made without departing from the true spirit and scope of the techniques. By way of example but not limitation, in an optional embodiment of the LA techniques described herein, once a login session is established between the secure server and the distrusted client's web browser, and the client's browser is allowed to access the secure server's web pages and/or information services that are specifically sanctioned by the user's account, the server can routinely verify that the mobile device is still connected to the client by pinging the trusted device over the second secure connection at a prescribed interval in order to verify that the trusted device is still connected to the client. Whenever the server fails to receive the trusted device's ping response within a prescribed timeframe, the server would close the login session with the client's browser. This routine pinging of the trusted device by the server prevents a malicious party from accessing information on the server when the trusted device loses power or the trusted device's connection to the client is lost for some other reason. In another optional embodiment the pinging is implemented as a request from the server to the trusted device for the trusted device to increment a counter. The initial value of the counter is set by the server to a large random number which is transmitted to the trusted device when the server completes the second secure connection thereto (refer to FIG. 5B process action 518). Then each time the trusted device receives a request from the server over the second secure connection to increment the counter, the trusted device increments the counter and transmits the incremented count to the server over the second secure connection. Upon receiving this count, the server compares it to the count it expected to receive based on the count it last received from the trusted device.

It is noted that any or all of the aforementioned embodiments can be used in any combination desired to form additional hybrid embodiments. Although the LA technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

4.0 Computing Environment

This section provides a brief, general description of a suitable computing system environment in which portions of the LA technique embodiments described herein can be implemented. These LA technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 9:
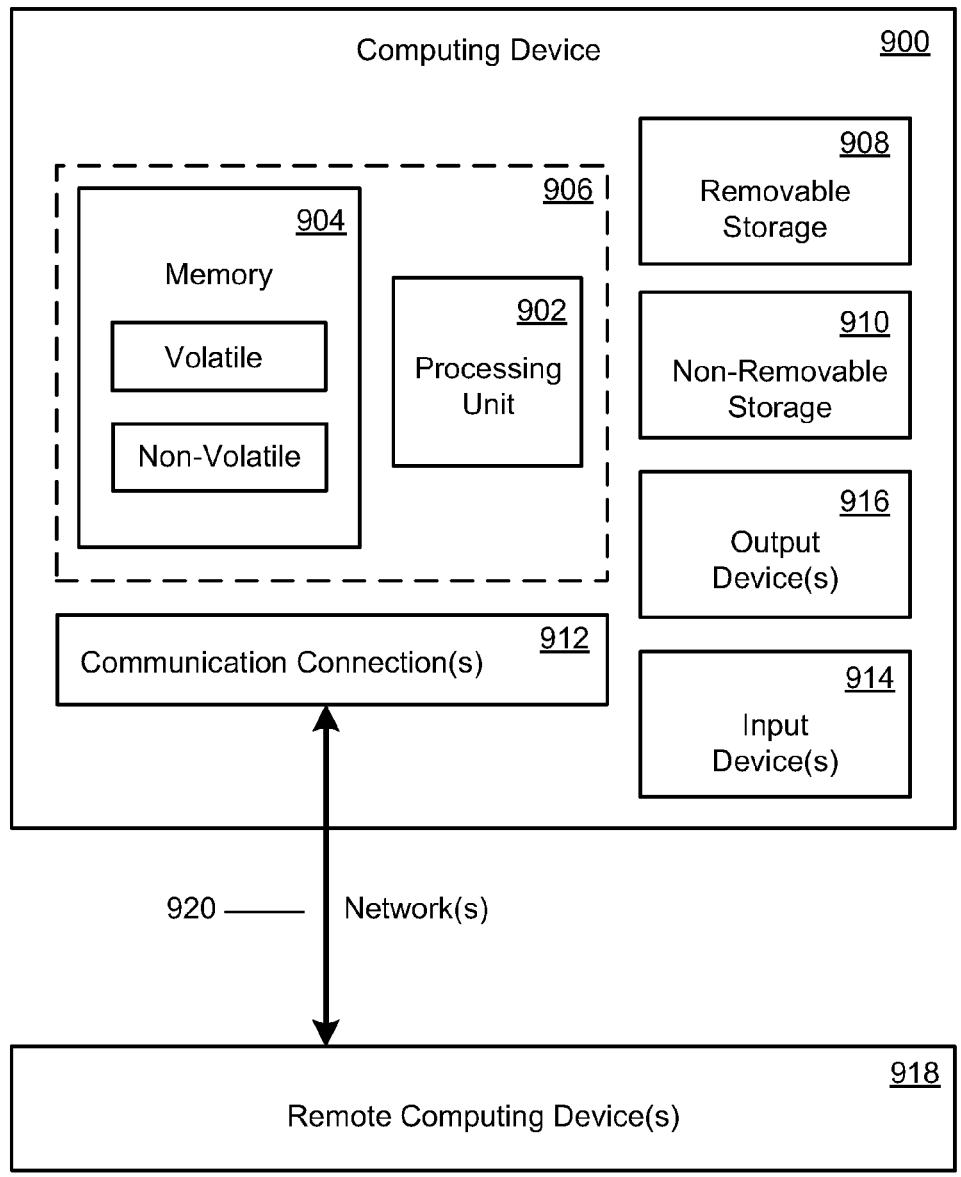
FIG. 9 illustrates a diagram of an exemplary embodiment, in simplified form, of a general purpose, network-based computing device which constitutes an exemplary system for implementing the LA technique embodiments described herein.

FIG. 9 illustrates a diagram of an exemplary embodiment, in simplified form, of a suitable computing system environment according to the LA technique embodiments described herein. The environment illustrated in FIG. 9 is only one example of a suitable computing system environment and is not intended to suggest any limitation as to the scope of use or functionality of the LA technique embodiments described herein. Neither should the computing system environment be interpreted as having any dependency or requirement relating to any one or combination of components exemplified in FIG. 9.

As exemplified in FIG. 9, an exemplary system for implementing the LA technique embodiments described herein includes one or more computing devices, such as computing device 900. In its simplest configuration, computing device 900 typically includes at least one processing unit 902 and memory 904. Depending on the specific configuration and type of computing device, the memory 904 can be volatile (such as RAM), non-volatile (such as ROM and flash memory, among others) or some combination of the two. This simplest configuration is illustrated by dashed line 906.

As exemplified in FIG. 9, computing device 900 can also have additional features and functionality. By way of example, computing device 900 can include additional storage such as removable storage 908 and/or non-removable storage 910. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 900 such as computer readable instructions associated with an operating system, application programs and other program modules, and data structures, among other things. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 900. Any such computer storage media can be part of computing device 900.

As exemplified in FIG. 9, computing device 900 also includes a communications connection(s) 912 that allows the device to operate in a networked environment and communicate with a remote computing device(s), such as remote computing device(s) 918. Remote computing device(s) 918 can be a PC, a server, a router, a peer device, or other common network node, and typically includes many or all of the elements described herein relative to computing device 900. Communication between computing devices takes place over a network(s) 920, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 912 and related network(s) 920 described herein are exemplary and other means of establishing communication between the computing devices can be used.

As exemplified in FIG. 9, communications connection(s) 912 and related network(s) 920 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 9, computing device 900 also includes an input device(s) 914 and output device(s) 916. Exemplary input devices 914 include, but are not limited to, a keyboard, mouse, pen, touch input device, microphone, and camera, among others. A user can enter commands and various types of information into the computing device 900 through the input device(s) 914. Exemplary output devices 916 include, but are not limited to, a display device(s), a printer, and audio output devices, among others. These input and output devices are well known and need not be described at length here.

Referring again to FIG. 9, the LA technique embodiments described herein can be further described in the general context of computer-executable instructions, such as program modules, which are executed by computing device 900. Generally, program modules include routines, programs, objects, components, and data structures, among other things, that perform particular tasks or implement particular abstract data types. The LA technique embodiments can also be practiced in a distributed computing environment where tasks are performed by one or more remote computing devices 918 that are linked through a communications network 912/920. In a distributed computing environment, program modules can be located in both local and remote computer storage media including, but not limited to, memory 904 and storage devices 908/910.

Wherefore, what is claimed is:

1. A computer-implemented process for allowing a user working on a client computer to remotely login to a server over a computer network, comprising using the client to perform the process actions of:
    establishing a first secure connection between the client and the server;
    establishing communications with a trusted device which is in the user's control via a communication channel between the trusted device and the client other than said network; and
    facilitating the establishment of a second secure connection between the trusted device and the server through the client, wherein the second secure connection is tunneled within the first secure connection and is employed to remotely login to the server using the trusted device.

2. The process of claim 1, wherein the client comprises a web browser and the process action of establishing a first secure connection between the client and the server comprises actions of:
    transmitting a secure connection request message over the network to the server, said message comprising a list of ciphers and hash functions that are supported by the client's browser;
    receiving a secure connection response message over the network from the server, said message specifying the cipher and hash function picked by the server, and comprising a digital certificate which identifies the server and specifies a public key for the server;
    using the digital certificate to verify the authenticity of the server;
    whenever the server is determined to be unauthentic, disabling the first secure connection; and
    whenever the server is determined to be authentic,
        generating a random number-based first session key,
        encrypting the first session key with the public key, and
        transmitting the encrypted first session key over the first secure connection to the server.

3. The process of claim 2, wherein the process action of facilitating the establishment of a second secure connection between the trusted device and the server through the client comprises actions of:
    transmitting the digital certificate which identifies the server and specifies its public key over the communication channel to the trusted device;
    upon the trusted device using the digital certificate to verify the authenticity of the server and the trusted device subsequently generating a random number-based second session key which the trusted device encrypts with said public key, receiving a server authentication result message over the communication channel from the trusted device, said message comprising the encrypted second session key;
    whenever said message specifies that the server was determined to be unauthentic, disabling the second secure connection; and
    whenever said message specifies that the server was determined to be authentic, transmitting the encrypted second session key over the first secure connection to the server.

4. The process of claim 2, further comprising actions of:
    whenever a trusted device connectivity application module is not installed on the client,
        transmitting a message requesting said application over the first secure connection to the server, and
        receiving said application over the first secure connection from the server, and installing and executing it on the client.

5. The process of claim 1, wherein the client comprises a web browser and the process action of establishing communications with a trusted device which is in the user's control via a communication channel between the trusted device and the client other than said network comprises actions of:
    prompting the user to choose between a plurality of different methods for remotely logging into the server via a user interface of the client; and
    whenever the user chooses to remotely login to the server using the trusted device, pairing the client's browser to the trusted device.

6. The process of claim 5, wherein the process action of pairing the client's browser to the trusted device comprises actions of:
    searching the communication channel between the trusted device and the client for other devices attached thereto;
    displaying a user-selectable list of detected devices to the user via the user interface of the client, wherein said list comprises the trusted device;
    upon the user's entry into said user interface of their selection of the trusted device from the list, transmitting a pairing request message over the communication channel to the trusted device; and
    upon receiving a pairing approval message over the communication channel from the trusted device, completing a pairing connection to the trusted device over the communication channel.

7. The process of claim 5, wherein the process action of facilitating the establishment of a second secure connection between the trusted device and the server through the client comprises an action of verifying the trusted device's pairing to the client's browser, said verification comprising actions of:
    receiving a first random number over the first secure connection from the server;
    displaying the first random number to the user via the user interface of the client along with a prompt for the user to visually compare said displayed number to a second random number which is displayed to the user via a user interface of the trusted device; and upon the user's entry into the user interface of the client of their comparison result,
transmitting a comparison result message over the first secure connection to the server, and
transmitting said message over the communication channel to the trusted device, wherein said message specifies whether or not the first random number matches the second random number, and upon receipt of said message by the trusted device said message is displayed to the user via the user interface of the trusted device.

8. The process of claim 1, wherein the trusted device comprises one of a mobile phone, a pocket personal computer, an ultra-mobile personal computer, a mobile music player, or an intelligent keypad.

9. The process of claim 1, wherein,
the communication channel between the trusted device and the client comprises one of a wireless Bluetooth connection or a wired Universal Serial Bus connection, and
the first secure connection and second secure connection are implemented using either a Secure Sockets Layer protocol or a Transport Layer Security protocol.

10. A computer-implemented process for allowing a user working on a client computer to remotely login to a server over a computer network, comprising using the server to perform the process actions of:
establishing a first secure connection between the server and the client;
establishing a second secure connection between the server and a trusted device through the client, wherein,
the trusted device is in the user's control and communicates with the client via a communication channel between the trusted device and the client other than said network, and
the second secure connection is tunneled within the first secure connection; and
facilitating the user's remote login over the second secure connection to the server using the trusted device.

11. The process of claim 10, wherein the client comprises a web browser and the process action of establishing a first secure connection between the server and the client comprises actions of:
receiving a secure connection request message over the network from the client's browser, said message comprising a list of ciphers and hash functions that are supported by the client's browser;
analyzing the list of ciphers and hash functions, and picking the strongest cipher and hash function that are supported by the server;
transmitting a secure connection response message over the network to the client's browser, said message specifying the picked cipher and hash function, and comprising a digital certificate which identifies the server and specifies a public key for the server; and
upon the client's browser using the digital certificate to verify the authenticity of the server, receiving an encrypted first session key over the first secure connection from the client's browser and decrypting said first key using a private key for the server.

12. The process of claim 11, wherein the process action of establishing a first secure connection between the server and the client further comprises actions of:
receiving a message from the client's browser over the first secure connection requesting a trusted device connectivity application module; and
transmitting said application over the first secure connection to the client's browser.

13. The process of claim 11, wherein the process action of establishing a second secure connection between the server and a trusted device through the client comprises actions of:
transmitting a login method prompt message over the first secure connection to the client's browser, wherein said message asks the user to choose between a plurality of different methods for remotely logging into the server; and
whenever the user chooses to remotely login to the server using the trusted device, and upon the trusted device being paired to the client's browser via the communication channel between the trusted device and the client,
receiving an encrypted second session key over the first secure connection from the client's browser and decrypting said second key using the private key for the server, said second key originating from the trusted device and signifying that the trusted device determined that the server was authentic using the digital certificate, and
verifying the trusted device's pairing to the client's browser.

14. The process of claim 13, wherein the process action of verifying the trusted device's pairing to the client's browser comprises actions of:
upon the generation of a random number by the trusted device and the display of said generated number to the user via a user interface of the trusted device, receiving said generated number over the second secure connection from the trusted device;
upon the user's entry of said displayed generated number into a user interface of the client, receiving said entered number over the first secure connection from the client's browser;
comparing said generated number received from the trusted device to said entered number received from the client's browser; and
transmitting a comparison result message over the second secure connection to the trusted device, wherein said message specifies whether or not said generated number matches said entered number, and upon receipt of said message by the trusted device said message is displayed to the user via the user interface of the trusted device.

15. The process of claim 13, wherein the process action of verifying the trusted device's pairing to the client's browser comprises actions of:
transmitting an animation over the first secure connection to the client's browser, wherein upon receipt of the animation by the client's browser the animation is displayed to the user via a user interface of the client;
upon the user's entry of animation control commands into a user interface of the trusted device, receiving the entered control commands over the second secure connection from the trusted device;
updating the animation based on the received control commands;
transmitting the updated animation over the first secure connection to the client's browser, wherein upon receipt of the updated animation by the client's browser the updated animation is displayed to the user via the user interface of the client; and
upon the user's visual comparison of the entered control commands to the displayed updated animation, and upon the user's subsequent entry of their comparison result into the user interface of the trusted device, receiving a comparison result message over the second secure connection from the trusted device, wherein said message specifies whether or not the entered control commands match the displayed updated animation.

16. The process of claim 10, wherein the server comprises a user account and either web pages, information services, or web pages and information services, the trusted device comprises a device identification (ID) code which has been pre-registered in the user account, and the process action of facilitating the user's remote login over the second secure connection to the server using the trusted device comprises actions of:
transmitting a login prompt message over the second secure connection to the trusted device, wherein said message asks the user to enter their login credentials, and upon receipt of said message by the trusted device said message is displayed to the user via a user interface of the trusted device;
upon the user's entry of their login credentials into the user interface of the trusted device,
receiving the entered login credentials and device ID code over the second secure connection from the trusted device, and
authenticating the received login credentials and device ID code against information in the user account;
whenever the received login credentials and device ID code are positively authenticated, establishing a login session with the client's browser and allowing the browser to access the web pages and information services on the server that are specifically sanctioned by the user account; and
whenever the received login credentials and device ID code are not positively authenticated, preventing access to the web pages and information services on the server.

17. The process of claim 16, wherein the process action of establishing a login session with the client's browser and allowing the browser to access the web pages and information services on the server that are specifically sanctioned by the user account comprises an action of verifying all data writes to the server which are initiated by the client's browser, said verification comprising actions of:
upon receiving a data write request over the first secure connection from the client's browser, transmitting a message over the second secure connection to the trusted device, said message requesting that the user explicitly approve the data write via the user interface of the trusted device; and
upon the user's entry of their approval of the data write into the user interface of the trusted device, receiving a data write approval message over the second secure connection from the trusted device and allowing the data write to be completed.

18. The process of claim 16, wherein the process action of establishing a login session with the client's browser and allowing the browser to access the web pages and information services on the server that are specifically sanctioned by the user account comprises an action of routinely verifying that the trusted device is still connected to the client, said verification comprising actions of:
routinely pinging the trusted device over the second SSL connection at a prescribed interval; and
whenever a ping response is not received from the trusted device within a prescribed timeframe, closing the login session.

19. The process of claim 16, wherein the process action of establishing a login session with the client's browser and allowing the browser to access the web pages and information services on the server that are specifically sanctioned by the user account comprises an action of verifying each suspect action on the server which is initiated by the client's browser, said verification comprising actions of:
upon receiving a request to perform a suspect action over the first secure connection from the client's browser,
transmitting a first human interactive proof (HIP) over the first secure connection to the client's browser, wherein upon receipt of said HIP by the client's browser said HIP is displayed to the user via a user interface of the client, and
transmitting a second HIP over the second secure connection to the trusted device, wherein upon receipt of said HIP by the trusted device said HIP is displayed to the user via the user interface of the trusted device;
upon the user's entry of an appropriate response to the first HIP into the user interface of the client, receiving said first HIP response over the first secure connection from the client's browser;
upon the user's entry of an appropriate response to the second HIP into the user interface of the trusted device, receiving said second HIP response over the second secure connection from the trusted device; and
whenever both the first HIP response and second HIP response are correct, allowing the suspect action to be completed.

20. A computer-implemented process for allowing a user working on a client computer comprising a web browser to remotely login to a server over a computer network, comprising using the client to perform the process actions of:
establishing a first secure connection between the client and the server, said establishment comprising actions of,
receiving a digital certificate which identifies the server and specifies a public key for the server,
using the digital certificate to verify the authenticity of the server, and
whenever the server is determined to be unauthentic, disabling the first secure connection;
prompting the user to choose between a plurality of different methods for remotely logging into the server via a user interface of the client; and
whenever the user chooses to remotely login to the server using a trusted device which is in the user's control, wherein the trusted device communicates with the client via a communication channel there-between other than said network,
pairing the client's browser to the trusted device,
facilitating the establishment of a second secure connection between the trusted device and the server through the client, wherein the second secure connection is tunneled within the first secure connection, said facilitation comprising actions of,
transmitting the digital certificate over the communication channel to the trusted device,
upon the trusted device using the digital certificate to verify the authenticity of the server and the trusted device subsequently generating a random number-based second session key which the trusted device encrypts with the public key, receiving a server authentication result message over the communication channel from the trusted device, said message comprising the encrypted second session key,
whenever said message specifies that the server was determined to be unauthentic, disabling the second secure connection, and
whenever said message specifies that the server was determined to be authentic, transmitting the encrypted second session key over the first secure connection to the server, and verifying the trusted device's pairing to the client's browser, said verification comprising actions of, receiving a first random number over the first secure connection from the server, displaying the first random number to the user via the user interface of the client along with a prompt for the user to visually compare said displayed number to a second random number which is displayed to the user via a user interface of the trusted device, and upon the user's entry into the user interface of the client of their comparison result, transmitting a comparison result message over the first secure connection to the server, and transmitting said message over the communication channel to the trusted device, wherein said message specifies whether or not the first random number matches the second random number, and upon receipt of said message by the trusted device said message is displayed to the user via the user interface of the trusted device.

* * * * *